United States Patent
Romanenko

(10) Patent No.: US 9,584,732 B2
(45) Date of Patent: Feb. 28, 2017

(54) EXPOSURE CONTROLLER

(71) Applicant: Apical Ltd, Loughborough (GB)

(72) Inventor: Ilya Romanenko, London (GB)

(73) Assignee: Apical, Ltd., Loughborough (GB)

(*) Notice: Subject to any disclaimer, the term of this patent is extended or adjusted under 35 U.S.C. 154(b) by 77 days.

(21) Appl. No.: 14/469,479

(22) Filed: Aug. 26, 2014

(65) Prior Publication Data

US 2014/0362282 A1    Dec. 11, 2014

Related U.S. Application Data

(63) Continuation of application No. PCT/EP2013/053929, filed on Feb. 27, 2013.

(30) Foreign Application Priority Data

Feb. 27, 2012    (GB) .................................. 1203354.4

(51) Int. Cl.
H04N 5/235    (2006.01)

(52) U.S. Cl.
CPC ......... *H04N 5/2353* (2013.01); *H04N 5/2351* (2013.01); *H04N 5/2355* (2013.01); *H04N 5/2356* (2013.01)

(58) Field of Classification Search
CPC .. H04N 5/2351; H04N 5/2353; H04N 5/2355; H04N 5/35536; H04N 5/35545; H04N 5/35554; H04N 5/35572; H04N 5/35581
See application file for complete search history.

(56) References Cited

U.S. PATENT DOCUMENTS

| | | |
|---|---|---|
| 2004/0218830 A1 | 11/2004 | Kang et al. |
| 2007/0285526 A1 | 12/2007 | Mann et al. |
| 2008/0252750 A1* | 10/2008 | Ogawa ............... H04N 5/23232 |
| | | 348/229.1 |
| 2010/0103194 A1 | 4/2010 | Chen et al. |
| 2010/0157078 A1 | 6/2010 | Atanassov et al. |
| 2010/0165135 A1 | 7/2010 | Kalevo |
| 2011/0090361 A1 | 4/2011 | Kobayashi et al. |
| 2011/0090365 A1 | 4/2011 | Cha et al. |
| 2012/0013789 A1* | 1/2012 | Yeo ......................... G06T 5/009 |
| | | 348/363 |

FOREIGN PATENT DOCUMENTS

| | | |
|---|---|---|
| EP | 1255410 A2 | 11/2002 |
| GB | 2464574 A | 4/2010 |
| WO | 2009/029810 A1 | 3/2009 |

OTHER PUBLICATIONS

International Search Report and Written Opinion issued in corresponding application No. PCT/EP2013/053929 on May 31, 2013.

* cited by examiner

*Primary Examiner* — Daniel M Pasiewicz
(74) *Attorney, Agent, or Firm* — EIP US LLP

(57) ABSTRACT

An image sensor provides a first image with a first exposure and a second image with a second exposure. An exposure controller sets the first exposure in dependence on pixel intensities of at least one of the images. It sets the second exposure in dependence on a factor and the first exposure. The factor is determined in dependence on pixel intensities of at least one of the images.

13 Claims, 3 Drawing Sheets

EXPOSURE CONTROLLER

CROSS-REFERENCE TO RELATED APPLICATIONS

This application is a continuation of International Application No. PCT/EP2013/053929, filed Feb. 27, 2013, which claims the benefit of GB Application No. 1203354.4, filed Feb. 27, 2012. Each of the above-referenced patent applications is incorporated by reference in its entirety.

BACKGROUND OF THE INVENTION

Field of the Invention

The present application relates to an exposure controller for an image sensor, a system including such a controller, a method for use in the controller and a computer program implementing the method.

Description of the Related Technology

An exposure controller is known for controlling the exposure of a plurality of dark pixels and of a plurality of bright pixels in an image sensor. The controller sets the exposure of the dark and bright pixels independently by determining the number of dark pixels that have a signal level below a 'low' threshold and the number of bright pixels that have a signal level above a 'high' threshold, respectively. The two partial images obtained by the dark and bright pixels are combined by adding signal levels of the corresponding dark and bright pixels to one merged pixel in a merged image with a large dynamic range.

If the known setting of the exposures is applied to a high dynamic range capture system involving multiple images captured sequentially in time, or involving alternation of exposure line by line as the sensor is scanned, the merged image may have a low quality.

SUMMARY

In accordance with the present application, there is provided an exposure controller for controlling an exposure of a plurality of pixels of an image sensor, the image sensor providing a first image having a first exposure and a second image having a second exposure, the exposure controller may be arranged to set the first exposure in dependence on pixel intensities of at least one of the images, to determine a factor in dependence on pixel intensities of at least one of the images, and to set the second exposure in dependence on the factor and the first exposure.

The inventor has discovered that the low quality of the merged image in the prior art is at least in part due to artifacts caused by the process of merging the two images, which artifacts increase with increasing difference between the first and second exposure. In image sensors where the time periods over which the first and second image are captured are different, motion may cause artifacts. This problem of artifacts can be mitigated by a smooth evolution of the two exposures as the dynamic range of the scene to be imaged increases. The application provides this smooth evolution by making the first and second exposure interdependent instead of setting them independently as in known systems. The application makes the second exposure dependent on the first exposure and a factor determined by the first and/or second image. An appropriate choice of the relation between the two exposures and the factor allows the smooth evolution, thereby reducing the artifacts.

The application also relates to a system for capturing images including an image sensor and an exposure controller according to the application.

A further aspect relates to a method of controlling an exposure of a plurality of pixels of an image sensor, the image sensor providing a first image having a first exposure and a second image having a second, different exposure, the method including the step of setting the first exposure in dependence on pixel intensities of at least one of the images, determining a factor in dependence on pixel intensities of at least one of the images, and setting the second exposure in dependence on the factor and the first exposure.

The application further relates to a computer program for controlling an exposure of a plurality of pixels of an image sensor adapted to perform the method according to the application and to a data carrier including such a computer program.

Further features will become apparent from the following description of embodiments, given by way of example only, which is made with reference to the accompanying drawings.

DETAILED DESCRIPTION OF CERTAIN INVENTIVE EMBODIMENTS

Figure 1:
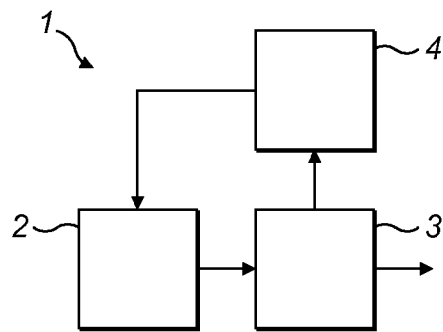
FIG. 1 shows a system for capturing images.

FIG. 1 shows a system 1 for capturing images, e.g. a camera, including an electronic image sensor 2, an image processor 3 and an exposure controller 4. The image processor and the exposure controller may be integrated in one processor. An image of a scene is captured by the image sensor. The sensitivity of an image sensor to incident light is determined by the exposure, which sets the time period over which light is captured by each pixel of the image sensor and/or the gain applied by an amplifier to the electrical signal generated by the pixel. The captured image is transferred to the image processor as an array of pixel intensities. The exposure controller obtains data from the image processor, usually pixel intensities, derives an exposure from this data and transmits the exposure to the sensor for automatically setting the exposure of the sensor at a value optimum for the scene imaged onto the image sensor.

The dynamic range of an image refers to the ratio in pixel intensities between the brightest and darkest pixels within that image. Conventional image sensors capture images with dynamic ranges up to approximately 80 dB. Image sensor-based systems capable of capturing images with dynamic ranges significantly in excess of this value are typically referred to as high dynamic range.

The system in FIG. 1 is suitable for high dynamic range image capture. It captures two or more images that may have different exposures, which are merged into a single image. The dynamic range of the captured images is usually smaller than the dynamic range of the merged image. The different exposures of the two or more images may be realized by different time periods over which light is captured by each pixel and/or the gain applied by an amplifier to the signal output by a pixel. Hence, a low/high exposure has a short/ long time period and/or a low/high amplification. The different time periods for capturing the images may by successive in time or partially or completely overlapping.

In the embodiment described below a first image and a second image are captured sequentially in time. Alternatively, the first and second image may be captured within a single frame by alternating the exposure between each line or pair of lines to produce two images each of half the vertical resolution. The first image has a good contrast in the highlights of the scene and the second image has a good contrast in the shadows of the scene. The two captured images are merged into one image, using a known merging method, as for example disclosed in "Being 'undigital' with digital cameras: Extending dynamic range by combining differently exposed pictures" by S. Mann and R. Picard in Proceedings of IS&T 46$^{th}$ annual conference May 1995, pages 422-428. The merged images may form a video stream by combining the captured first and second image in each subsequent pair of frames to a series of merged images.

Figure 2:
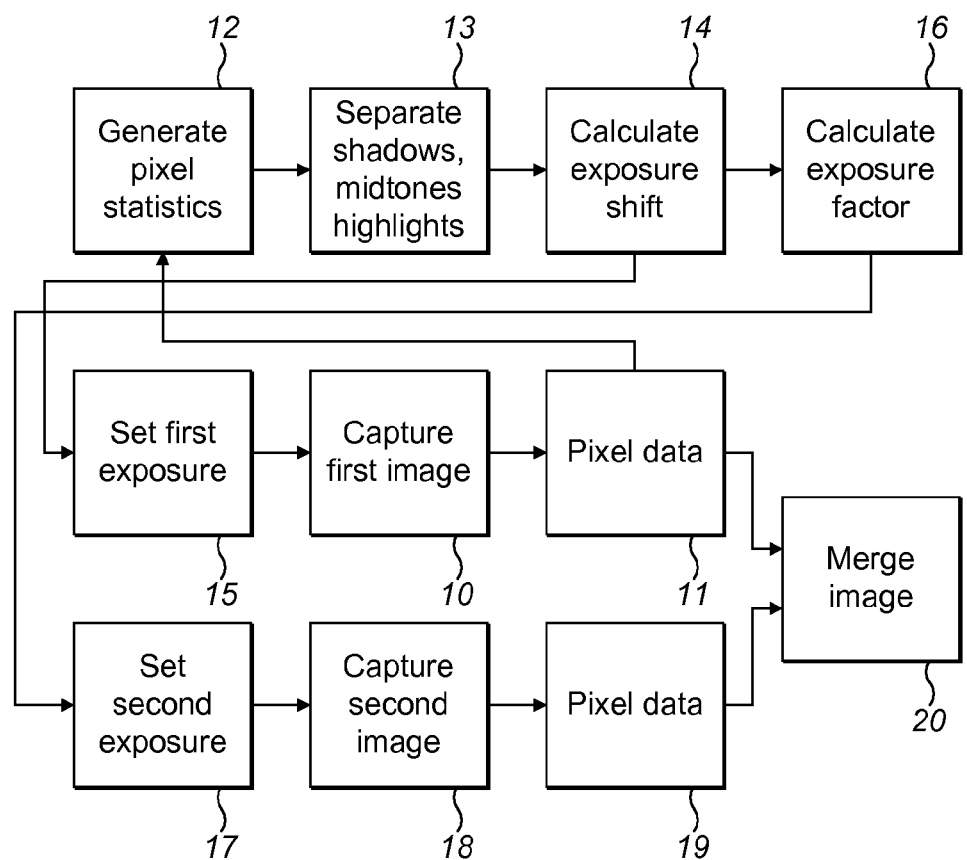
FIG. 2 shows schematically a procedure for setting exposures.

FIG. 2 shows schematically a method for setting the exposure for the capture of the two images. The exposure of the first image is set using a first image captured by the image sensor 2 in step 10 of FIG. 2. In step 11 the pixel data of the first image is transferred to the image processor 3. The exposure controller 4 generates pixel statistics of the pixel data in step 12. The exposure controller separates the pixel data in shadows, midtones and highlights in step 13. It uses this data to determine an exposure shift in step 14, which is used in step 15 to set the first exposure, i.e. the exposure for the first image. The exposure controller uses the data obtained in step 13 also to calculate an exposure factor in step 16. This factor is used in step 17 to set a second exposure for the second image in dependence on the first exposure. After capture of the second image in step 18, the pixel data are also transferred to the image processor 3 in step 19. The first and second image are combined by the image processor into a merged image in step 20.

Figure 3A:
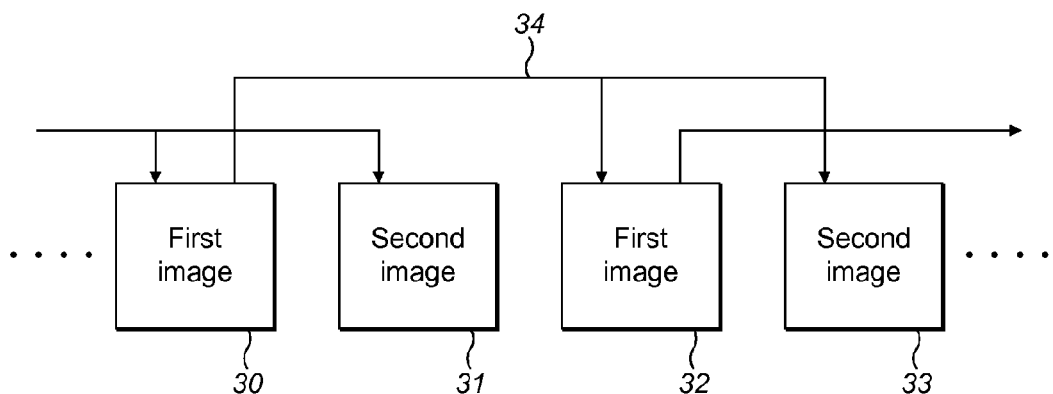
FIGS. 3a and 3b show time sequences of captured images.
Figure 3B:
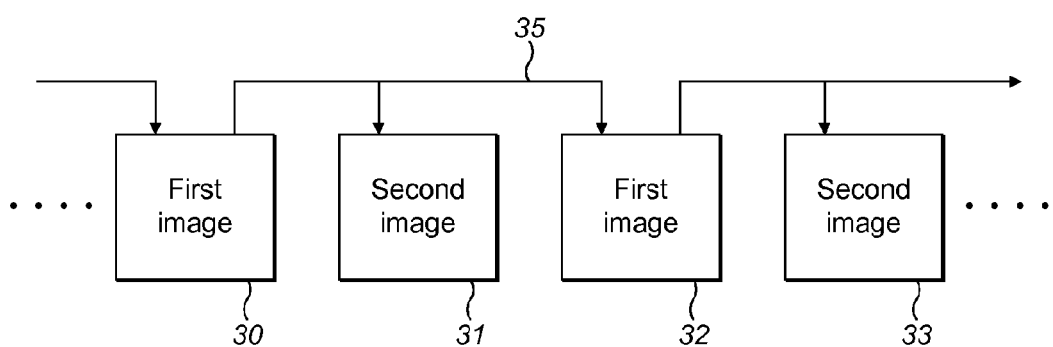

FIG. 3a shows a time sequence of first images 30 and 32 and second images 31 and 33, captured by the image sensor. Pixel data of the first image 30 is used to determine the exposure of the next first image 32 and the second image 33 directly following this first image 32, as indicated by the line 34. FIG. 3b shows the same time sequence of images, but with a different exposure control as shown by line 35. The pixel data of the first image 30 is used to determine the exposure of the next second image 31 and the directly following first image 32.

The first exposure may be determined from the pixel data in a known manner, using a prior art automatic exposure control. However, use may be made of the division of the pixel data in step 13 in zones, such as shadows, midtones and highlights, which division is also used for the determining the second exposure. The first exposure is based on a weighted average of a distribution of the pixel intensities. To this end an intensity histogram having a number of zones is defined, i.e. a distribution of pixel intensities over intensity zones. Each zone has an associated weighting factor for weighting the pixel population in the zone. The division of the intensity histogram in a number of zones each with a zone weighting factor allows weighting the intensity distribution, for example towards shadows, midtones or highlights.

In step 14 the following balance brightness $H_{bal}$ of the image is determined using:

$$H_{bal} = C_c + \frac{1}{N}\sum_i (C_i - C_C) * \frac{Z_i}{T_i}$$

wherein N is the number of zones along a pixel intensity scale, $C_c$ is the central intensity, $C_i$ is the center value of each zone, $Z_i$ is the number of pixels in each zone and $T_i$ is a weighting factor, which can also be considered as the target zone population.

A value of N equal to 3 has shown to provide a stable method for setting the exposures. In this case the three zones are called 'shadows', 'midtones' and 'highlights'. The number of zones may be larger than 3, even substantially larger. In this case, the weighting factors can be divided into multiple regions, e.g. three regions, which can be called 'shadows', 'midtones' and 'highlights'; the weighting factor $T_i$ can be constant for each zone within a region. Although the described embodiments have zones and/or regions that are contiguous in intensity, they may cover non-contiguous intensity intervals.

Figure 4:
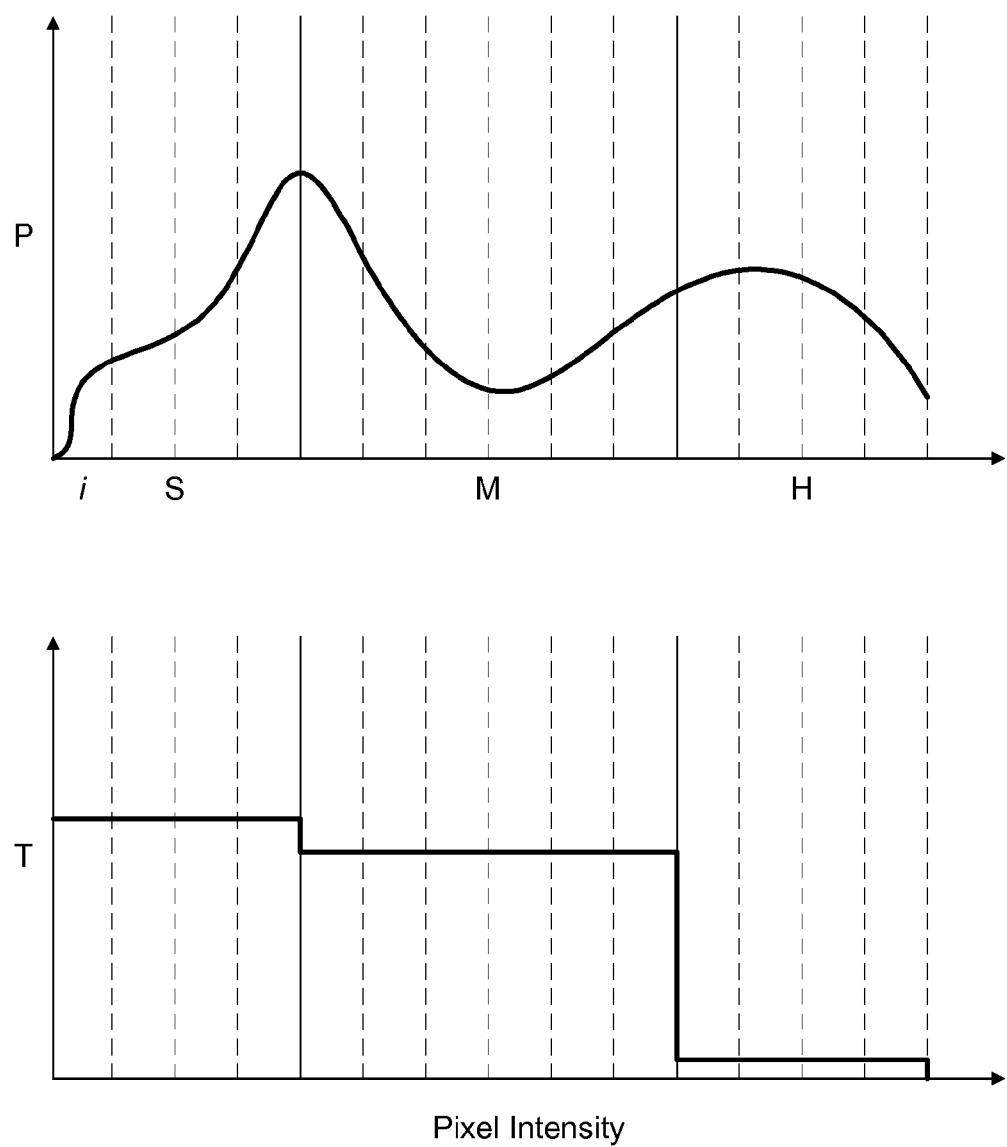
FIG. 4 shows an example of a pixel intensity histogram and a target histogram.

The top part of FIG. 4 shows an example of a pixel intensity histogram showing the population P as a function of pixel intensity and having 14 zones divided into three regions S (shadows), M (midtones) and H (highlights). The lower part of FIG. 4 shows an example of a target zone population T as a function of pixel intensity, with N=14 and $T_S$=0.5 P; $TM_M$=0.45 P; $T_H$=0.05 P; Cc=7.5; $C_1$=2.5; $C_2$=7.5 and $C_3$=12.5. If all pixels are symmetrically distributed in the middle region, $H_{bal}$=7.5. In the target population, half of the pixels have intensities that fall in the S region, i.e. in the shadows, and only 5% of the pixels fall in the highlights. The weighting reduces the number of pixels in highlights relative to the total number of pixels. Hence, the target population relates to a low exposure, giving a good contrast in the highlights of the scene. It preserves highlights in the case of high dynamic range scenes but for low dynamic range scenes it sets a balanced exposure wherein the majority of the pixels are close to the target exposure.

To obtain the first, low exposure, the difference brightness HΔ is determined from $$H_\Delta = H_{bal} - H_{target}$$

where $H_{target}$ is the target brightness what is input to the auto-exposure algorithm for determining the first exposure. $H_{target}$ is commonly set around the middle of the intensity range. $H_{target}$=7 in the example of FIG. 4; hence, when $H_{bal}$=7, the first exposure will not change. The difference brightness is used to determine the direction of change of the first exposure. If $H_\Delta$<0, the first exposure $E_S$ should be increased by an amount proportional to the magnitude of $H_\Delta$. If $H_\Delta$>0, the first exposure should be decreased by an amount proportional to its magnitude. The change in exposure or exposure shift is determined in step 14 of FIG. 2. The auto-exposure converges to $H_{target}$ when $H_\Delta$ is equal to or close to zero.

The first exposure may alternatively be determined by controlling the number of pixels clipped at their maximum intensity. The number of clipped pixels may be controlled to be lower than a pre-determined threshold. This can be implemented by setting $H_\Delta$>0 if this number exceeds a threshold value and $H_\Delta$<0 otherwise. The stability of convergence of the exposure is better for the above method where $H_\Delta$ is based on the balance brightness.

The second exposure is set in dependence on the first exposure and a factor depending on the pixel intensities of the first image and/or second image. The factor may be an additive factor, such that the second exposure is equal to the first exposure plus the factor. The factor may be a multiplicative factor and the second exposure is proportional to the first exposure and the factor. In an embodiment the second exposure is a high exposure $E_H$ that is related to the first, low exposure $E_L$:

$$E_H = E_L * H_{rat}$$

where the factor $H_{rat}$ is a brightness ratio that may be derived from the intensity histogram of the first image. When the factor $H_{rat}$ increases with increasing dynamic range of the scene, the second exposure increases smoothly with respect to the first exposure. The factor may have a lower limit of one.

The factor may depend on a pixel population of shadows and highlights relative to a pixel population of midtones of at least one of the images. In this case the factor is a measure for the population of shadows and highlights, and therewith a measure of the dynamic range of the scene imaged. The relation between the factor and the dynamic range of the scene permits a control of the first and second exposure in dependence on the dynamic range of the scene.

In an embodiment, the factor or brightness ratio is based on a sum of a fixed constant and a weighted average of the pixel populations. The value of $H_{rat}$ changes smoothly from a low dynamic range scene with the intensity population concentrated in the midtones to a high dynamic range scene having shadows and highlights. This provides a smooth evolution of the exposures from a single exposure to two different exposures when the dynamic range of the scene increases. In a particular embodiment $H_{rat}$ is given by $$H_{rat} = \frac{\left(\sum_{i \in S,H} \frac{Z_i}{T_i}\right) + R}{\left(\sum_{i \in M} \frac{Z_i}{T_i}\right) + R}$$

where R is a constant parameter, which controls the sensitivity of the brightness ratio to differences in zone populations, i.e. to the dynamic range of the scene. If R is large, $H_{rat}$ becomes small for any image. The value of R is sensor dependent and is determined empirically; a typical value is ⅛. The target zone populations may be the same as used in the determination of the first exposure. The minimum value of $H_{rat}$ may be set to unity, such that $H_{rat}$ is larger than or equal to unity.

For a low dynamic range scene, the weighted populations in zones in shadows and highlights will be small compared to the weighted population in midtones, such that $H_{rat}$ is small and $E_H \approx E_L$. However, for a high dynamic range scene, where the weighted populations of zones in shadow and highlights regions significantly exceeds that of midtones, $H_{rat}$ is large and $E_H > E_L$. The second image will show a good contrast in the shadows.

In an alternative embodiment, the above equation for Hrat is changed by taking the sum in the numerator over all zones instead of only over the shadows and highlights zones. The above equation provides a better stability near $H_{rat}=1$.

In an embodiment of the method a threshold $H_{max}$ is defined, such that $H'_{rat}=\min(H_{rat}, H_{max})$. If the brightness ratio between the first and second image is larger than an image sensor dependent value, the merging of the first and second image will result in an image having a degraded quality. A typical value for $H_{max}$ is 8 or 16.

When the brightness ratio becomes relatively large, e.g. larger than 8 or 16, the quality of the merged image will be improved when the merged image is a combination of three or more images instead of only the first and second image. The exposure of the one or more intermediate images is intermediate the first and second exposure. In this method the first and second exposure is determined as in the above embodiments. If $H_{rat}$ is less than the threshold $H_{max}$, no additional images are captured. If $H_{rat}$ is larger than $H_{max}$, a middle exposure is determined, e.g. as $$E_M = E_L + \frac{H_{rat}}{2H_{max}}(E_H - E_L)$$

The middle exposure will lie midway between the first and second exposure when the brightness ratio is large and lie closer to the low exposure as the brightness ratio becomes smaller.

In the above described embodiments, the pixel data for determining the first and second exposure is taken from the first image, i.e. the low exposure image. Alternatively, the pixel data may be taken from only the high exposure image. The pixel data may also be taken from a combination of the first and second image or from the merged image, which does not have detrimental effects caused by any clipping at the maximum intensity of the high exposure image. However, use of the low exposure image only is computationally easier than the alternatives.

The embodiments of the method can be implemented in a computer program. The computer program may be stored in a memory of the exposure controller 4 in FIG. 1.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An exposure controller for controlling an exposure of a plurality of pixels of an image sensor, the image sensor providing a first image having a first exposure and a second image having a second exposure, the first image and the second image being in a time sequence of images captured by the image sensor, the exposure controller being arranged to:
    set the first exposure in dependence on pixel intensities of one of the time sequence of images;
    determine pixel populations in a shadows zone, a midtones zone and a highlights zone of one of the time sequence of images;
    calculate a factor in dependence at least in part on the pixel populations of the shadows zone and the highlights zone relative to the pixel population of the midtones zone; and
    set the second exposure in dependence on the factor and the first exposure.

2. The exposure controller according to claim 1, wherein the factor is multiplicative and the second exposure is proportional to the first exposure and the factor.

3. The exposure controller according to claim 1, wherein the factor and/or the first exposure is derived from an intensity histogram having a number of zones, each zone having a weighting factor for weighting the pixel population in the zone.

4. The exposure controller according to claim 3, wherein the weighting reduces the number of pixels in the highlights zone relative to the total number of pixels.

5. The exposure controller according to claim 3, wherein the factor is based on a sum of a fixed constant and a weighted average of the pixel populations.

6. The exposure controller according to claim 1, wherein the first exposure is based on a weighted average of a distribution of the pixel intensities.

7. The exposure controller according to claim 1, wherein the first exposure is a low exposure having a number of pixels clipped at a maximum intensity, the number being lower than a pre-determined threshold.

8. The exposure controller according to claim 1, wherein the image sensor is arranged to provide a third image having a third exposure, the third exposure being between the first exposure and the second exposure.

9. A system for capturing images including an image sensor and an exposure controller according to claim 1.

10. A method of controlling an exposure of a plurality of pixels of an image sensor, the image sensor providing a first image having a first exposure and a second image having a second, different exposure, the first image and the second image being in a time sequence of images captured by the image sensor, the method comprising:
   setting the first exposure in dependence on pixel intensities of one of the time sequence of images;
   determining pixel populations in a shadows zone, a midtones zone and a highlights zone of one of the time sequence of images;
   calculating a factor in dependence at least in part on the pixel populations of the shadows zone and the highlights zone relative to the pixel population of the midtones zone; and
   setting the second exposure in dependence on the factor and the first exposure.

11. The method of claim 10, wherein the factor is a ratio and the second exposure is proportional to the first exposure and the ratio.

12. The method of claim 10, including the step of deriving the factor and/or the first exposure from an intensity histogram having a number of zones, each zone having a weighting factor for weighting the pixel population in the zone.

13. A non-transitory computer-readable storage medium comprising computer-executable instructions which, when executed by a processor, cause a computing device to control an exposure of a plurality of pixels of an image sensor, the image sensor providing a first image having a first exposure and a second image having a second, different exposure, the first image and the second image being in a time sequence of images captured by the image sensor, the computing device configured to control the exposure of the plurality of pixels of the image sensor by:
   setting the first exposure in dependence on pixel intensities of one of the time sequences of images;
   determining pixel populations in a shadows zone, a midtones zone and a highlights zone of one of the time sequence of images;
   calculating a factor in dependence at least in part on the pixel populations of the shadows zone and the highlights zone relative to the pixel population of the midtones zone; and
   setting the second exposure in dependence on the factor and the first exposure.

* * * * *